June 14, 1938.　　J. F. SPELLACY ET AL　　2,120,315
SLAB TURNING APPARATUS
Filed Nov. 5, 1937　　2 Sheets-Sheet 1

INVENTOR.
JOHN F. SPELLACY &
THOMAS L. BURRELL
BY
THEIR ATTORNEY.

June 14, 1938.  J. F. SPELLACY ET AL  2,120,315
SLAB TURNING APPARATUS
Filed Nov. 5, 1937   2 Sheets-Sheet 2
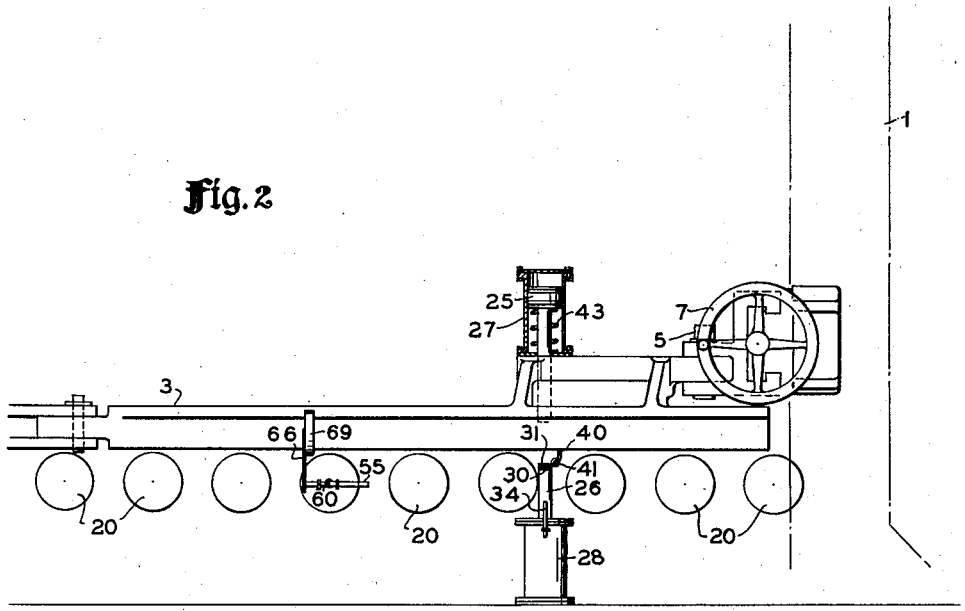
Fig. 2
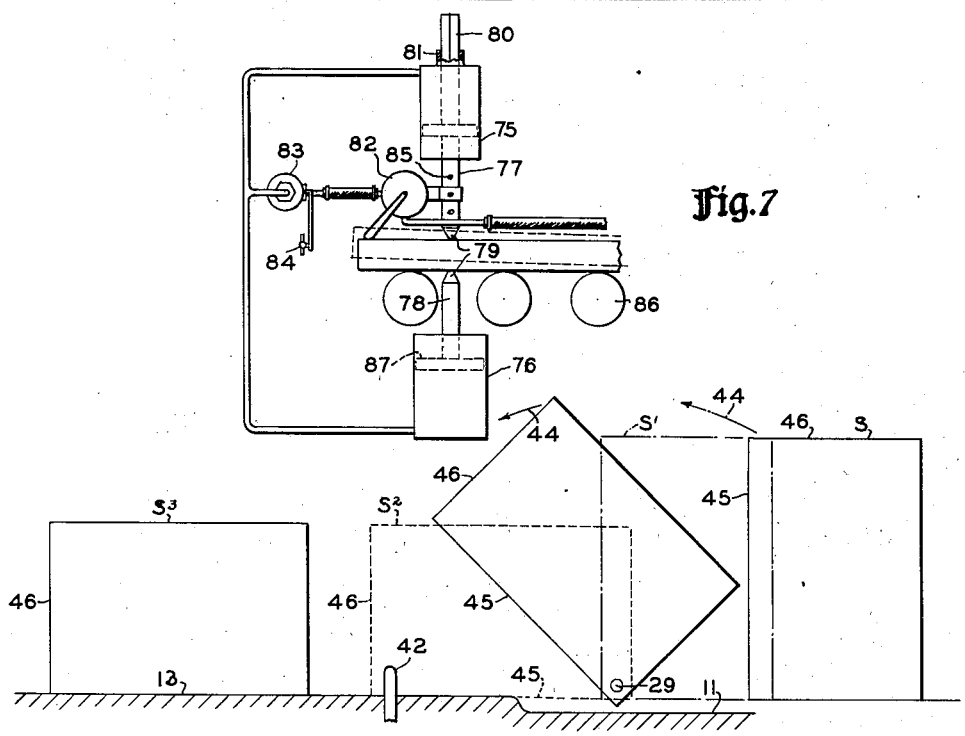
Fig. 7
Fig. 3
INVENTORS.
JOHN F. SPELLACY &
THOMAS L. BURRELL
BY
THEIR ATTORNEY.

Patented June 14, 1938

2,120,315

UNITED STATES PATENT OFFICE 2,120,315

SLAB TURNING APPARATUS

John F. Spellacy, Fairview Village, and Thomas L. Burrell, Cleveland, Ohio

Application November 5, 1937, Serial No. 172,992

10 Claims. (Cl. 198—33)

This invention relates to a slab clamping and turning apparatus for turning steel or ferrous slabs for cross rolling and the like, and this application comprises a continuation in part of our copending application Serial No. 143,803, filed May 20, 1937, and entitled Slab turning device.

In our co-pending application there is described a slab turning and clamping apparatus by which the slab is positively clamped in a manner such that the conveying rolls effect the turning operation, and in addition thereto, there is shown an apparatus by which the slab is frictionally engaged for the same purpose, the frictional apparatus being fully claimed in said copending application. The present application includes the slab clamping and turning apparatus as described and set forth in said copending application, with the addition thereto of a certain modification which renders the slab turning action more efficient.

In the manufacture of steel strip and bar stock, the usual practice is to pass the cropped and heated ingot or steel slab to a suitable scale breaking mill or reduction mill, the slab passing to the mill endwise or crosswise, as desired, along conveyors, such as suitably driven conveying rolls or chains, to a transfer table. Such a table is usually a large and expensive hydraulically hoisted platform which lifts the slab clear of the conveyor, rotates it 90° about a vertical axis, and redeposits it on the conveyors so that it enters the mill at 90° to its original position. For example, the slab may pass through the first mill sidewise and before it is passed through the succeeding mill, it is turned endwise, whereupon it is again turned sidewise preparatory to entry into the third mill, this action continuing until the slab has been reduced to a predetermined size and shape. Not only are the transfer tables employed very expensive, but also they are comparatively slow in operation, requiring a temporary stopping of the travel slab during its rotation to its new position.

One of the principal objects of the present invention is to provide a new and improved means for effecting this turning or rotation of the slab during its passage from one mill to the next.

A more specific object is to provide a clamp which may be used in connection with the conventional transfer rolls and guides and which automatically engages and causes the desired rotation and repositioning of the slab without any appreciable cessation in its rate of travel.

Another specific object is to provide a positive clamping apparatus by which the slab, as it is transported along the conveying rolls, is not only gripped at a portion near one corner so that it is caused to swing in a horizontal plane through an angle of 90° to the position in which it is gripped, but is also lifted slightly by the corner at which it is gripped. The result of this lifting action is that only those marginal portions of the under face of the slab which are farthermost from the portion clamped remain in contact with the rolls, and relative sliding friction of the portions of the slab which are nearer to the clamped portion, longitudinally of the rolls or transversely to the path of travel of the slab, is greatly reduced and the slab rotates to its new position more readily.

Other objects and advantages will become apparent from the following specification wherein reference is made to the drawings, in which Fig. 1 is a horizontal plan view of the discharge end of one mill and the conveying rolls leading to the next mill, showing the invention installed for use in connection therewith, part thereof being shown in section for clearness in illustration;

Fig. 2 is a side elevation of the structure illustrated in Fig. 1;

Fig. 3 is a diagrammatic illustration of successive operations of the apparatus;

Figure 1:
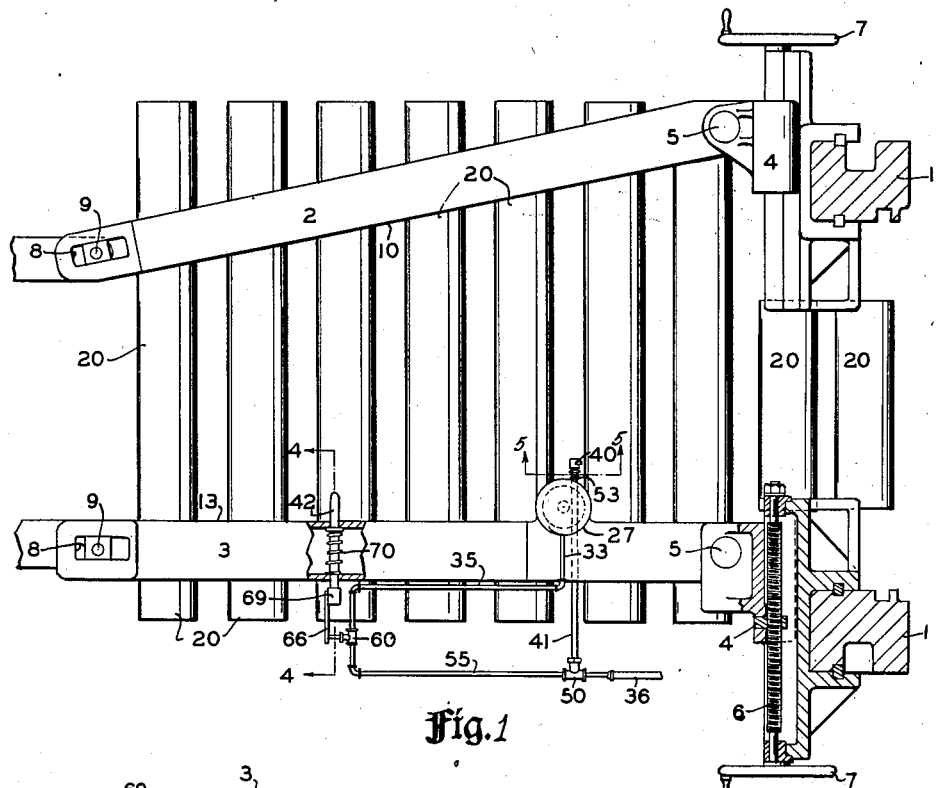
Figures 4, 5:
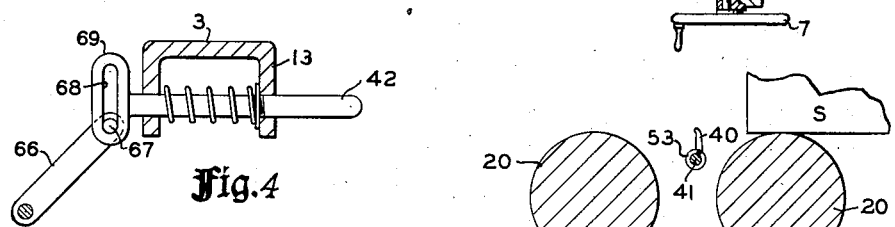
Figure 6:
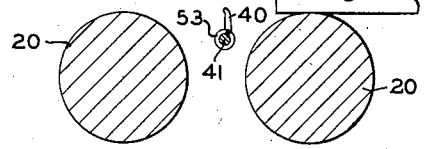

Figs. 4 and 5 are fragmentary vertical sectional views taken on lines 4—4 and 5—5, respectively, of Fig. 1;

Fig. 6 is a diagrammatic illustration of part of the apparatus showing the automatic fluid pressure control and operating circuit; and Fig. 7 is a diagrammatic illustration of a modification of the invention.

Referring to the drawings, the upright columns of the frame of the rolling mill from which the slab is being delivered are indicated at 1. Connected to the frame members 1 are laterally adjustable longitudinally extending guides 2 and 3, respectively, for guiding the slab into a succeeding mill. Each of the guides 2 and 3 is provided at the end adjacent the first mill with a suitable worm follower 4 which is pivotally connected to the end of the guide by a pivot 5. The worm follower operates on a suitable screw 6 which is mounted on the frame 1 of the mill for rotation about a horizontal laterally extending axis and may be rotated by a suitable hand wheel 7 for moving the follower 4 laterally of the mill. The opposite end of each guide is provided with a longitudinal slot 8 in which slides a pivot 9 fastened to the frame of the succeeding mill, the longitudinal slot compensating for the difference between the swinging radius of the guide and the chordal path of the follower 4. Both guides have upright guide surfaces, such as the surface indicated at 10 on the guide 2, the guide surfaces extending longitudinally of the path of travel of the slab. However, in the case of the guide surface of the guide 3, the relatively leading portion 11 is offset outwardly from the plane of the relatively trailing guide surface portion 13 thereof, for purposes later to be described. Below the level of the guides 2 and 3 are conveying rolls 20 which may be continuously driven so as to transport the slab issuing from the mill 1 to the succeeding mill.

At a distance beyond the mill 1, at least slightly greater than the maximum length of the slab to issue therefrom, is the clamping mechanism with which the present invention is particularly concerned. This mechanism may comprise a pair of hydraulically or pneumatically operated pistons 25 and 26 which are aligned axially with each other and arranged one above and one below the path of the slab. The pistons 25 and 26 are mounted in hydraulic or pneumatic cylinders 27 and 28 so as to be driven relatively toward each other by fluid pressure. The cylinders 27 and 28 are preferably carried on the guide 3 so as to operate in the proper relation thereto in all adjusted positions of the guide 3.

Carried on the bottom end of the piston 25 is a gripping shoe 29 which may be rotatable about its own axis and the axis of the piston on suitable ball bearings 30. Correspondingly, a gripping shoe 31 is provided on the piston 26. The shoes 29 and 31 are preferably slightly convex and arcuate or spherical on their gripping faces so that substantially only point contact with the slab is effected.

The cylinders 27 and 28 are connected to a suitable source of fluid under pressure, such as pneumatic pressure, which is readily available in steel mills, the cylinders being connected in parallel to the fluid pressure circuit by suitable pipe lines 33, 34, and 35, to which fluid pressure is supplied from a flexible hose line 36 through valves later to be described.

The shoes 29 and 31 are so arranged that the leading corner of the slab nearest the guide 3 will pass therebetween. At the instant of such passage, the pressure fluid is introduced into the cylinders 27 and 28 and forces the pistons into gripping relation with the opposite faces of the slab adjacent the corner. Since the cylinders 27 and 28 are interconnected in the fluid pressure circuit, the pistons will accommodate themselves to the thickness of the particular slab and will not lift it from the rolls 20 or force it too tightly thereagainst. Thus, the gripping or clamping mechanism floats vertically and is self-adjusting for the thickness of the particular slab.

With the slab gripped in this manner, the continuous driving of the rolls 20 causes it to begin swinging about its clamped corner, that is, about the common axis of the pistons 25 and 26, and to continue to do so until the leading corner which was originally directly opposite from the gripped corner, transversely of the path of travel of the slab, has swung around and engaged the trailing guide surface portion 13 of the guide 3. This swinging or turning action thereby disposes, parallel to the trailing portion 13 of the guide 3, that edge of the slab which was originally the leading edge or side. In this position the slab may be released, the desired turning having been accomplished without appreciably interrupting the travel of the slab. The device may be operated by hand by the operator if desired, but automatic control is preferred.

As one example of automatic control, a suitable rock lever or wiper 40 is fixedly mounted on a rock shaft 41 which is carried on the guide 3. The wiper 40 extends from beneath the top plane of the conveying rolls 20 thereabove and into a position to be engaged by the slab, indicated at S in Figs. 3 and 5, and rocked the proper amount when the corner of the slab is in the proper position between the shoes 29 and 31 to cause the shoes to clamp the slab.

The wiper 40 operates a means, later to be described, such that, when the wiper is rocked by the slab, the source of fluid pressure is connected to the cylinders 27 and 28 and remains connected as long as the wiper is held in the rocked position. For releasing the slab after it has been turned, a plunger 42 is mounted in the portion 13 of the guide 3 in a position to be engaged and moved laterally of the guide portion 13 when the leading edge or side of the slab has been swung alongside the guide. The plunger 42 operates a means for disconnecting the cylinders 27 and 28 from the source of fluid pressure and venting them to the atmosphere or to a suitable sump. Return springs 43 may be used for restoring the pistons 25 and 26 to starting position when the fluid pressure is relieved for restoring the shoes 29 and 31 to non-gripping position. Obviously, if desired, the gripping action may be effected by the springs and the return action by the fluid pressure mechanism.

Referring next to Fig. 3, the turning operation is diagrammatically illustrated. In such instance the slab S is moving endwise from left to right. When it passes between the clamping shoes 29 and 31, it is gripped near one corner and begins swinging, as indicated by the arrow 44, one swinging position of the slab being indicated at $S_1$. It continues swinging around the axis of the pistons until it reaches a position indicated by the dotted line $S_2$, in which instance its leading edge 45 lies alongside the trailing guide portion 13. In this position, it is released and continues moving in the new position, indicated at $S_3$, wherein what was originally the leading edge lies along the guide and the side edge 46 becomes the leading edge. It is to be noted that clearance must be allowed for the relative passage of the corner 47 of the slab during its rotation or turning. For this reason the leading guide portion 11 is offset from the trailing portion 13 as heretofore described.

The slab ordinarily is discharged from the mill onto the conveying rolls a few inches out from the guide 3 and is not required to be guided until the turning operation begins. If such guiding is required, only the portion of the guide portion 11 adjacent the clamping mechanism would be offset to permit relative passage of the corner 47 during rotation of the slab.

In order to render the fluid pressure operated pistons automatic, as heretofore mentioned, the rock shaft 41 is connected to the stem of a valve 50 for rotating the valve plug 51 thereof when the wiper 40 is rocked by the ingot or slab S. A suitable coil return spring 53 is provided in surrounding relation to the shaft 41 for restoring the wiper 40 and consequently the valve plug 51, to starting position when the slab passes out of engagement with the wiper 40. As better illustrated in Fig. 6, the valve plug 51 is provided with a single transverse passage 54 which, when the valve plug is rotated by the slab through the medium of the wiper 40, connects the pipe line 55 with a source of fluid under pressure, not shown, and when the valve is restored to its starting position by the spring 53, disconnects the line 55 from the source of fluid pressure. The wiper 40 is positioned so that when the ingot is in proper position to be gripped by the shoes 29 and 31, the wiper will open the valve 50.

Connected in the line 55 between the valve and the line 35 which leads to the cylinders is a valve 60 having a valve plug 61 which is provided with a diametral duct 62 and a bleeder duct 63 communicating with the duct 62 and extending substantially at right angles thereto. The valve plug 61 is so arranged that it normally occupies a position wherein the duct 62 connects the lines 35 and 55. The casing of the valve is provided with a bleeder vent 64 arranged so that when the valve plug 61 is rotated sufficiently to block the line 55 leading from the valve 50, the line 35, leading from the valve 60 to the cylinders, is connected with the vent 64 through the ducts 62 and 63. The valve plug 61 has an operating handle 66 having at one end an operating pin 67 which operates in a slot 68 in a yoke portion 69 of a releasing plunger 42. The plunger 42 at its inner end normally extends from the guide 3 into the path of travel of the slab and, as heretofore explained, is moved outwardly from the guide when engaged by the slab when the slab is rotated or turned to the position for release. A suitable spring 70 normally holds the plunger 42 in the extended position, in which position the plunger operates the valve 60 for opening the line 55. Upon retraction of the plunger by engagement with the ingot, the valve plug 61 is rotated to stop the flow of fluid pressure from the valve 50 and to connect the cylinders with the bleeder vent 64, thus releasing the pneumatic or fluid pressure, whereupon the plungers 25 and 26 release the slab.

As diagrammatically illustrated in Fig. 6, the control circuit is in normally inoperative position, the lines 35 and 55 being disconnected from the source of fluid pressure by the valve 50 and the plungers 25 and 26 being in withdrawn or non-clamping position. As the slab strikes the wiper 40, the valve 50 is opened and fluid under pressure passes through the line 55, the valve 60, and the line 35 into both the cylinders 27 and 28 for operating the same to grip the slab. This pressure is maintained until the slab strikes the plunger 42 and turns the valve plug 61 so as to disconnect the cylinders from the source of air under pressure and connect them through the duct 63 and duct 62 with the bleeder vent 64. In this position of the valve plug 61, the springs of the cylinders return the cylinders to a non-gripping position and the slab is released. This position of the valve plug 61 is maintained as the slab travels a short distance along its path of travel in its turned position and until it has released the wiper 40 which has meanwhile been depressed. During this period, obviously the only loss of air or liquid is that which was originally in the cylinders. Upon continued movement of the slab, the wiper 40 is released and disconnects the line 55 from the source of fluid pressure, the valve plug 51 returning to its starting position, as illustrated. Upon additional movement of the slab, the plunger 42 is released and the spring 70 then restores the plunger 42 and valve plug 61 to a position connecting the lines 55 and 35 so that the circuit is ready for repetition of the cycle.

It is apparent from the foregoing description that the apparatus may readily be installed for use in connection with existing mill equipment without change in the equipment itself. Further, the apparatus effects the operation of turning the slab preparatory to its entry into any given set of forming rolls, or successive turning of the slab between sets of forming rolls, without appreciably interrupting the travel thereof.

Referring next to Fig. 7, it sometimes happens, especially in connection with extremely heavy slabs, that considerable friction is developed between the slab and the conveying rolls on which it rests when the slab swings about its clamped portion. Since several rolls are simultaneously in contact with the under surface of the slab, the resulting drag is appreciable and likewise tends to mark the slab and to wear the conveying rolls. In any event, frictional resistance to movement of the slab is increased by this drag so that the turning is not as efficient as might be desired in all instances. It has been found, however, that if the slab is lifted slightly by its clamped corner so that it is slightly off of or only very lightly in contact with the rolls at all except those marginal portions which are farthest from the point of clamping, the slab swings more readily and this friction and resultant wear are so reduced as to be negligible. For effecting this operation, the structure illustrated in Fig. 7 may be used.

In the form illustrated in Fig. 7, two pneumatic or hydraulic cylinders 75 and 76 are provided, these cylinders being comparable in operation to the cylinders 27 and 28. Pistons 77 and 78 operate in the cylinders in the same manner as the pistons 26. Instead of the ball bearing contacting head on the pistons, however, the ends of the piston rods may be tapered slightly, as indicated at 79, so that a substantially point contact with the slab is maintained. The piston 77 is provided with a square rod portion 80 which is guided in a sleeve 81 on the cylinder 75 so that the piston 77 cannot rotate about its own axis. Valves 82 and 83 corresponding in form and function to the valves 50 and 60, heretofore described in connection with Figs. 1 to 6, are provided. The valve 82 is operated by the slab to cause the pistons and cylinders to effect clamping pressure when the valve handle is engaged by the leading edge of the slab. The valve 83, in turn, is operated by a plunger 84, corresponding to the plunger 42, and effects a release of the clamping pressure when the slab swings about its clamped corner to the proper position, and presses the plunger 84 outwardly toward the slab guide.

The structure illustrated in Fig. 7 may be mounted on the slab guide in the same manner as the structure described in connection with Figs. 1 to 6. When the valve 82 is arranged to be operated by the top leading edge of the slab instead of the bottom leading edge, it must be shifted in vertical position to compensate for different thicknesses of the slab, and for this purpose it may be clamped to the piston 77. Additional adjustment may be provided by suitable holes 85 in the piston 77, through which bolts may be received for clamping the valve 82 in different vertically adjusted positions thereon. If desired, however, the control apparatus may be the same as that described in Figs. 1 to 6. The main difference in the modified structure is that the cylinder 76 and the head of the cooperating piston 78 are of greater diameter than the cylinder 75 and piston 77. The cylinders 75 and 76 are interconnected in the same manner as the cylinders 27 and 28. Consequently, due to the greater size of the cylinder 76, when fluid is admitted to the cylinder, the piston 78 exerts greater force on the slab than the piston 77, this force being sufficiently greater to overcome both the force of the piston 77 and the weight of the slab. Thus the lower piston lifts the slab from its normal supported position on the conveying rolls 86 slightly thereabove at all except the outer margins of the slab remote from the piston 78, or, if not actually lifting the slab, reduces its effective weight on the rolls to such an extent that frictional drag is substantially eliminated.

As shown in exaggerated condition in dotted lines in Fig. 7, the slab is thus, in effect, in a position slightly raised from the rolls and free to turn without frictional drag of its entire face on the rolls. Furthermore, the frictional drag resulting from a differential in speed of portions of the slab at different distances from the swinging axis is substantially eliminated, as only the outermost portions are in sufficiently firm contact with the rolls to have any appreciable frictional engagement therewith. Since the piston 78 can overcome the piston 77 and the weight of the slab, it is necessary that a suitable stop be provided to limit the upward movement of the piston 78, and in the form illustrated, this stop is provided by the inner end wall 86 of the cylinder 76 which engages the end face 87 of the cylinder of the head of the piston 78.

We claim:

1. In an apparatus for the purposes described, continuously driven conveyor rolls for supporting and transporting a slab of material along a predetermined path, guide means for guiding the slab and adjustable laterally of the path of travel of the slab, clamping means carried thereby and engageable with a portion of the slab, which portion is offset from the mid-portion of the slab, for arresting movement thereof lineally by the rolls while permitting rotation of the slab about said clamped portion, whereby the rolls cause the slab to swing about the clamped portion to a new rotated position, and means for releasing the slab in the new position for continued transportation along said path.

2. In an apparatus for the purposes described, continuously driven conveyor means for effecting movement of a slab of material along a predetermined path of travel, stationary clamping means for gripping a portion of the slab that is offset from the mid-portion of the slab for interrupting the movement of the slab lineally by said conveyor means, said clamping means permitting swinging movement of the slab about said portion, whereby continued driving by the conveyor means causes swinging of the slab into a different position, means rendered operative by the slab when the slab has moved to a predetermined position along said predetermined path to cause the clamping means to clamp said portion of the slab, and means for releasing the clamping means.

3. In an apparatus for the purposes described, continuously driven conveyor means for effecting movement of a slab of material along a predetermined path of travel, stationary clamping means for gripping a portion of the slab that is offset from the mid-portion of the slab for interrupting the movement of the slab lineally by said conveyor means, said clamping means permitting swinging movement of the slab about said portion, whereby continued driving by the conveyor means causes swinging of the slab into a different position, means rendered operative by the slab when the slab has moved to a predetermined position along said predetermined path to cause the clamping means to clamp said portion of the slab, and means rendered operative by the slab, when the slab has swung to said different position, to release the clamping means.

4. In an apparatus for the purposes described, continuously driven conveyor means for effecting movement of a slab of material along a predetermined path of travel, stationary clamping means for gripping a portion of the slab that is offset from the mid-portion of the slab for interrupting the movement of the slab lineally by said conveyor means, said clamping means permitting swinging movement of the slab about said portion, whereby continued driving by the conveyor means causes swinging of the slab into a different position, means positioned in the path of the slab and engaged and moved thereby to render the clamping means active, and means engaged and moved by the slab when the slab moves into said different position to render the clamping means idle for releasing the slab.

5. In an apparatus for the purposes described, continuously driven conveyor means for effecting movement of a slab of material along a predetermined path of travel, stationary clamping means for gripping a portion of the slab that is offset from the mid-portion of the slab for interrupting the movement of the slab lineally by said conveyor means, said clamping means permitting swinging movement of the slab about said portion, whereby continued driving by the conveyor means causes swinging of the slab into a different position, said clamping means comprising fluid operated, upright, axially aligned pistons engageable with opposite face portions of the slab respectively, cylinders for the pistons, means for connecting the cylinders with a source of fluid under pressure and in parallel with each other for causing gripping of the slab between the pistons while affording self-adjustment of the pistons axially, whereby the gripping pressure does not affect the conveyor means or lift the slab, and means for releasing the pistons from the slab and restoring them to starting position.

6. The combination with conveyor means for causing travel of a slab of material along a predetermined, substantially horizontal path, of clamping means mounted for vertical floating movement and engageable with top and bottom aligned face portions of the slab which are offset from the mid-portion for constraining the slab to swinging movement about an upright axis through the gripped portion.

7. In an apparatus for the purposes described, continuously driven conveyor means for supporting and transporting a slab of material along a predetermined path, guide means for guiding the slab, clamping means engageable with a portion of the slab, which portion is offset from the mid-portion of the slab, for arresting movement thereof lineally by the conveyor means while permitting rotation of the slab about said clamped portion, whereby the conveyor means cause the slab to swing about the clamped portion to a new rotated position, said means being operative to exert upward pressure on the slab to reduce the frictional drag between the conveyor means and portions of the slab during swinging of the slab, and means for releasing the slab in the new position for continued transportation along said path.

8. In an apparatus for the purposes described, continuously driven conveyor means for effecting movement of a slab of material along a predetermined path of travel, stationary clamping means for gripping a portion of the slab that is offset from the mid-portion of the slab for interrupting the movement of the slab lineally by said conveyor means, said clamping means permitting swinging movement of the slab about said portion, whereby continued driving by the conveyor means causes swinging of the slab into a different position, said clamping means comprising fluid operated, upright, axially aligned pistons engageable with opposite face portions of the slab respectively, cylinders for the pistons, means for connecting the cylinders with a source of fluid under pressure and in parallel with each other, and the lower one of said pistons having a greater effective area exposed to the fluid than the other pistons, and means for releasing the pistons from the slab.

9. In an apparatus for the purposes described, continuously driven conveyor means for effecting movement of a slab of material along a predetermined path of travel, stationary clamping means for gripping a portion of the slab that is offset from the mid-portion of the slab for interrupting the movement of the slab lineally by said conveyor means, said clamping means permitting swinging movement of the slab about said portion, whereby continued driving by the conveyor means causes swinging of the slab into a different position, said clamping means comprising fluid operated, upright, upper and lower clamping members engageable with the upper and lower face portions of the slab respectively, means for moving the members into pressure engagement with the slab for causing gripping of the slab between the members, and with the lower member exerting upward pressure in excess of the downward pressure exerted by the upper member, and means for releasing the members from the slab.

10. In an apparatus for the purposes described, continuously driven conveyor means for supporting and transporting a slab of material along a predetermined path, guide means for guiding the slab along said path of travel of the slab, clamping means engageable with a portion of the slab, which portion is offset from the mid-portion of the slab, for arresting movement thereof lineally by the rolls while permitting rotation of the slab about said clamped portion, whereby the rolls cause the slab to swing about the clamped portion to a new rotated position, and operative to lift and tilt the slab slightly relative to the conveyor means, by and about the engaged portion whereby only those portions of the slab most remote from the clamped portion frictionally engage the conveyor means, and means for releasing the slab in the new position for continued transportation along said path.

JOHN F. SPELLACY.
THOMAS L. BURRELL.